L. B. DOE.
DRAFT MEANS.
APPLICATION FILED APR. 20, 1920.
1,391,101.
Patented Sept. 20, 1921.
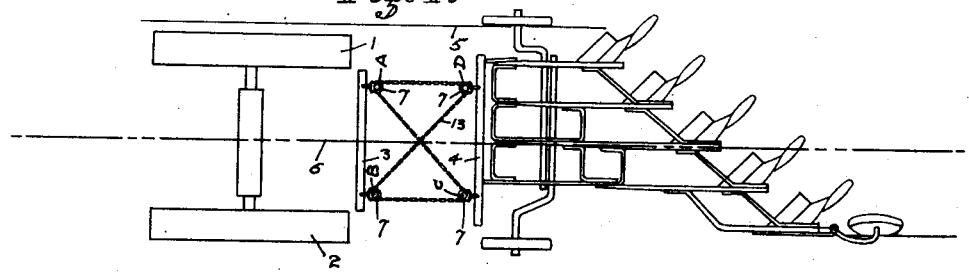
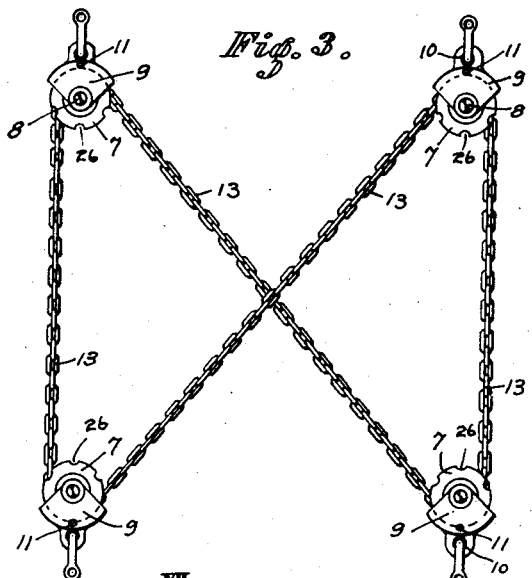
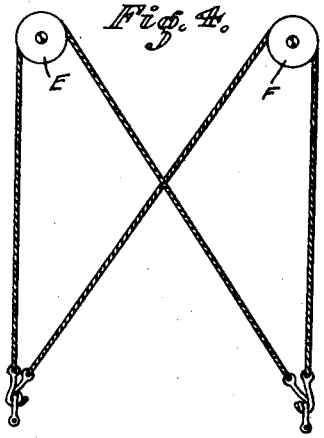
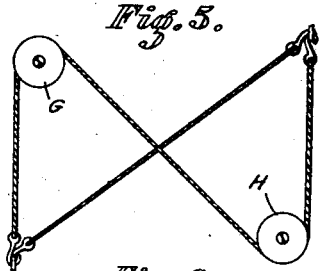
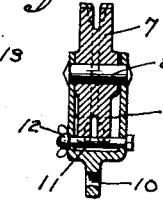
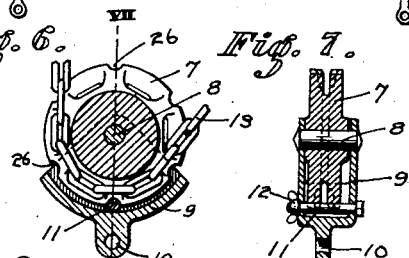
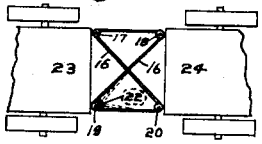
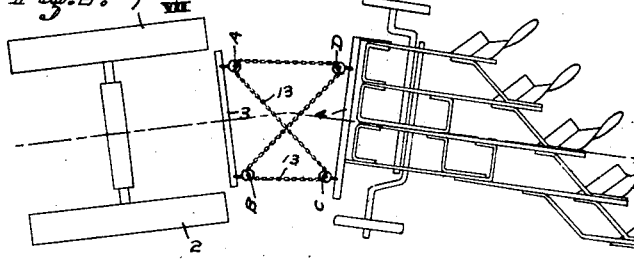
INVENTOR.
LORING B. DOE
BY
Bradley L. Benson
ATTORNEY

UNITED STATES PATENT OFFICE.

LORING B. DOE, OF SAN FRANCISCO, CALIFORNIA.

DRAFT MEANS.

1,391,101.  Specification of Letters Patent.  Patented Sept. 20, 1921.

Application filed April 20, 1920. Serial No. 375,398.

*To all whom it may concern:*

Be it known that I, LORING B. DOE, a citizen of the United States, residing at San Francisco, in the county of San Francisco and State of California, have invented certain new and useful Improvements in Draft Means, of which the following is a specification.

The present invention is an improved draft means. The primary object of the invention is to provide a compensating hitch adapted for use between tractors and various implements such as plows and cultivators.

Attention is called to my co-pending application Serial Number 288,384.

A second object of my invention is to provide a compensating hitch which will be automatic in the sense that the flexible connecting link will compensate as the tractor negotiates a curve or angle in its course, and which will be subject to instant adjustment without the necessity of delaying the tractor.

Another object of the invention is to provide a draft means whereby the strain of draft will be equalized between two points on the draw bar at all times, thus eliminating much of the side strain to which these implements are ordinarily subjected.

Another object is to provide a draft means which is quickly and easily changeable to positions which permit an offset of the implement pulled by the tractor to meet the various conditions of farm or orchard work, as for instance to enable a tractor to run entirely on unplowed ground in a level position to obviate the side thrust which is imposed on the tractor where one wheel or traction element runs on unplowed ground and the other in the furrow.

Other objects and advantages will appear as the description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the drawings:—

Figure 1 is a plan view of my improved draft means interposed between a plow of conventional type and a tractor, only the rear part of which is here shown.

Fig. 2 is a diagrammatic view of Fig. 1 illustrating the compensating feature of my hitch, as the implements shown in Fig. 1 negotiate the curve.

Fig. 3 is a plan view of my hitch detached.

Fig. 4 is a diagrammatic view illustrating another form of hitch into which my draft means is readily convertible.

Fig. 5 is a diagrammatic view of another form of hitch which can instantly be made with a slight adjustment of my draft means here shown.

Fig. 6 is a central section of a chain sheave, and

Fig. 7 is a section on the line VII—VII Fig. 6.

Fig. 8 is a plan view of a modified form of my invention interposed between two vehicles here shown in a fragmentary form.

Referring to the drawings, the numerals 1 and 2 indicate the rear wheels or driving elements of a tractor of any conventional type, provided with a draw bar 3 for draft connection with implements to be operated by said tractor.

At 4, I have shown a draw bar secured in any suitable manner to a gang plow. As shown in this figure, the tractor is running on unplowed ground, the furrow cut being indicated by the numeral 5. The center line of draft on both tractor and plow is indicated by the dotted line 6.

At points equi-distant from said center line of draft on both tractor and plow are rotatably secured eyes of chain sheaves, best shown in Fig. 3. As these sheaves, four in number, are exactly alike only one will be described. In Fig. 6 I have shown one of these sheaves in edge or side elevation. The chain sheave 7 is of conventional type journaled on a pintle 8 in a housing 9. The housing 9 is provided with an eye 10. The sheaves are also provided with bolts 11 which extend through both sides of the casing 9 and are secured therein by a wing nut 12. The purpose of the bolts 11 is to lock the sheave against rotation when a chain 13 is reeved through said sheave, as shown in Fig. 7. The bolt 11 holds the sheave 7, and extends between links of the chain 13, as best illustrated in Fig. 7.

My hitch is assembled as follows: A chain is reeved through four of the sheave casings just described, and welded or suitably joined to form an endless chain. Two of the said chain sheaves are inverted in such a manner as to form substantially a figure 8 of the endless chain. In assembling this figure 8 hitch between a tractor and an implement, it is arranged so that one sheave on each implement, that is to say, one on the tractor and one on the implement, is within each loop of the said figure 8, as shown in Fig. 1.

It is obvious that the chain sheave casings might be made in a great variety of shapes adapted to be secured to various machines, but I have elected here to show it in a simple form for shackle or clevis attachment.

At points equi-distant from the center line of draft on the tractor, sheave blocks A and B are pivotally secured in any suitable manner, while the sheave blocks C and D are pivotally secured to the draw bar 4; these sheaves also being spaced equi-distant from the center line of draft.

It results from this construction that a direct rearward pull is provided from each of the chain sheaves on the tractor, and at the same time an oblique pull to the opposite corner or sheave on the plow; the four sheaves being free to rotate. It will be seen that the pull is equally distributed between the sheaves A, B, C and D, and that as the course is varied, as shown in Fig. 2, the device will automatically compensate and adjust itself to the position shown in said Fig. 2, and one loop will contract as the other enlarges, and that the draft will at all times be equally distributed.

Under some conditions, it has been found advisable to secure the chain at one point, as shown in my co-pending application before mentioned, in which a hook is shown at one corner in place of a sheave.

In the device here shown, any one of the sheaves can be made to function as a hook by inserting a pin 11, secured by the wing nut 12, or both sheaves on either vehicle may be secured against rotation in the same manner, and the effect will be as shown in Fig. 4, the two lead sheaves being repeated by E and F.

Again the diagonally opposed sheaves may be secured against rotation, in which case the effect will be that shown in Fig. 5, the lead sheaves being indicated by the letters G and H.

In Fig. 8 I have shown a modification of my improved draft means wherein the flexible connecting member is a cable 16 in place of an endless chain; and substituted for the sheaves heretofore described are four pulleys 17, 18, 19 and 20.

While I prefer to use the chain and chain sheaves it is obvious that this form of device would operate as well as a compensating draft means.

In order to secure any of the pulleys against rotation, it would be necessary to put a cable clamp, as shown at 22, to secure the cable 16 at two points, as shown by dotted lines in Fig. 8. In this figure the numeral 23 designates a fragmentary rear end view of a tractor, and 24 a fragmentary forward end of a trailed vehicle.

In Fig. 7 I have shown serrations 26 adapted to engage the bolts 11 and secure the sheaves 7 against rotation.

Having thus described my invention what I claim as new and desire to secure by Letters Patent of the United States is as follows:—

1. A draft means comprising four chain sheaves, two of said sheaves rotatably secured on the tractor and two rotatably secured on a drawn vehicle, an endless chain reeved through and engaging said sheaves in such a manner that the said chain will assume substantially the form of a figure 8, said figure 8 being perpendicular to the line of draft, and having two sheaves, one on each implement in each loop of said figure 8, and in such a manner that each sheave will have a direct chain connection with the sheaves on both corners of the adjacent vehicle.

2. A draft means comprising four chain sheaves, two of said sheaves rotatably secured on the tractor and two rotatably secured on a drawn vehicle, an endless chain reeved through and engaging said sheaves in such a manner that the said chain will assume substantially the form of a figure 8, said figure 8 being perpendicular to the line of draft, and having two sheaves, one on each implement in each loop of said figure 8 in such a manner that each sheave will have a direct chain connection with the sheaves on both corners of the adjacent vehicle, and means on each of said sheaves for preventing rotation thereof.

In testimony whereof I affix my signature.

LORING B. DOE.